United States Patent [19]

Howe

[11] 4,033,312

[45] July 5, 1977

[54] CRANKCASE FOR MULTI-CYLINDER RECIPROCABLE PISTON INTERNAL COMBUSTION ENGINES

[75] Inventor: Hans-Ulrich Howe, Kippekausen, Germany

[73] Assignee: Klockner-Humboldt-Deutz Aktiengesellschaft, Cologne, Germany

[22] Filed: Jan. 16, 1976

[21] Appl. No.: 649,854

[30] Foreign Application Priority Data

Jan. 17, 1975 Germany .......................... 2501772

[52] U.S. Cl. ............................. 123/196 R; 184/6.5
[51] Int. Cl.² ....................... F01M 1/00; F01M 1/04
[58] Field of Search .................. 123/196 R; 184/6.5

[56] References Cited

UNITED STATES PATENTS 2,907,411  10/1959  Leach ................................. 184/6.5
2,988,081  6/1961  Etchells ......................... 123/196 R

*Primary Examiner*—Ronald H. Lazarus
*Attorney, Agent, or Firm*—Walter Becker

[57] ABSTRACT

A crankcase for multi-cylinder reciprocable piston internal combustion engines of the single row type, in which a lubricant feeding bore extending in the longitudinal direction of the crankcase is arranged in the vicinity of the camshaft bearings and communicates through connecting bores with the crankshaft bearings. These connecting bores extend outside the connecting screws for the bearing covers through abutment surfaces by means of which the crankshaft bearing covers engage the crankcase, and lead into transverse bores in the crankshaft bearing covers. The above mentioned connecting bores intersect bores through which the connecting screws for connecting the bearing covers pass and eventually lead into the crankshaft bearings.

9 Claims, 7 Drawing Figures

CRANKCASE FOR MULTI-CYLINDER RECIPROCABLE PISTON INTERNAL COMBUSTION ENGINES

The present invention relates to a crankcase for multicylinder reciprocable piston internal combustion engines of the single row type with at least one lubricating oil conveying bore which extends in longitudinal direction of the engine and from which additional lubricating bores extend in bearing walls transverse to the longitudinal axis of the engine housing to camshaft and crankshaft bearings, said crankshaft bearings being arranged in a suspended manner and comprising bearing covers which are connected to the crankcase by means of screws.

Crankcases of the above mentioned type have become known and are described for instance in the book "Die Konstruktion schnellaufender Verbrennungsmotoren" (Construction of High-Speed Internal Combustion Engines) by Hermann Mettig, pages 168, 169 issued Berlin, 1973. With these crankcases, the lubricating bores are located primarily in the field of lines of force of the bearing cover screws of the crankshaft bearing and, especially when a plurality of bores meet each other, weaken the crankscase in the critical region which during the ignition is particularly subjected to dynamic stresses, so that tears in the housing may occur within the region of the stress peaks. By supercharging and increasing the speed, in other words by higher pressures and higher load change frequencies, the stresses in the crankcase become more and more critical.

It is, therefore, an object of the present invention to overcome the above mentioned drawbacks by an improved arrangement of the lubricating bores and to provide a crankcase which will be able to withstand higher dynamic loads in spite of a reduced amount of material.

These and other objects and advantages of the invention will appear more clearly from the following specification in connection with the accompanying drawings, in which:

FIGS. 1 to 4 respectively illustrate four different embodiments of crankcases with different lubricating bores provided within the region of the cover for the crankshaft bearing.

Figure 1:
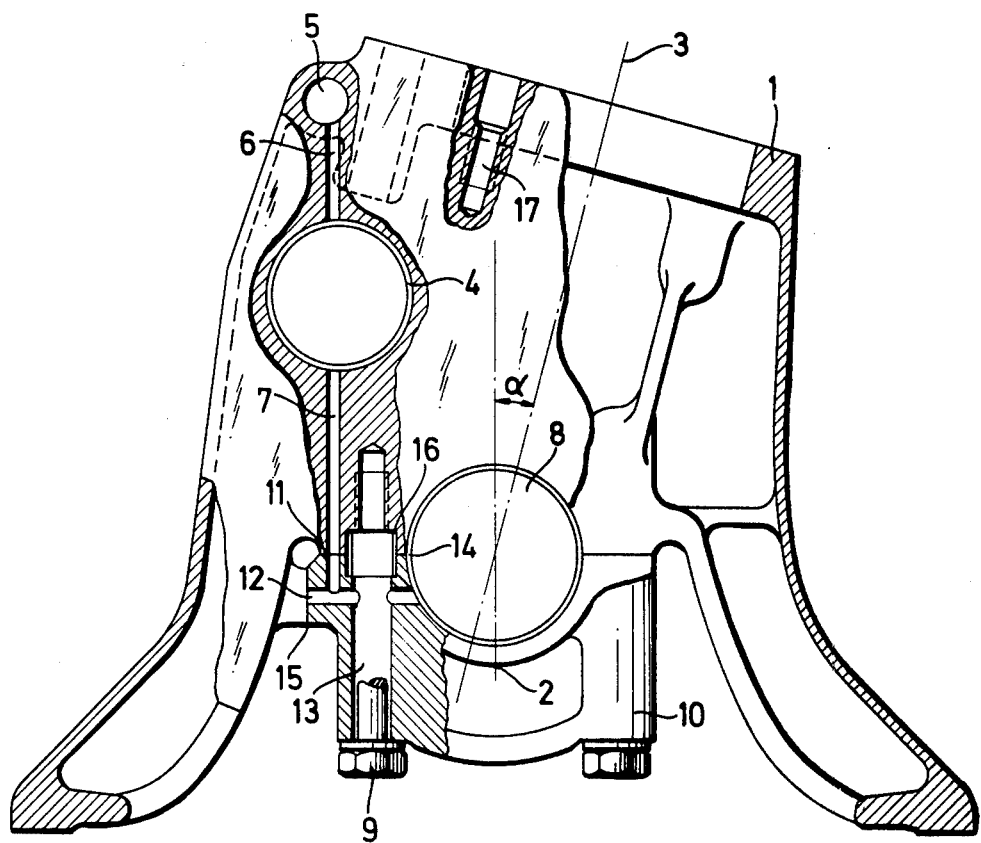

The crankcase according to the present invention is characterized primarily in that a longitudinally extending lubricant conveying bore is arranged in the vicinity of the camshaft bearing and, in case there is provided a plurality of longitudinally extending lubricating bores, is connected by a passage with the lubricating bores located on the oppositely located longitudinal side of the crank housing, said passage being from a stress technical point separated from the diametrically stressed transverse walls. The crankcase according to the invention is furthermore characterized in that the connecting bores to the crankshaft bearings extend outside of the bearing cover screws through engaging surfaces of the crankshaft cover and meet transverse bores located in the crankshaft bearing covers, which bores intersect the bores in the bearing cover screws and lead into said bores in the vicinity of the separating gap of the crankshaft bearings.

With the design according to the present invention, the bores are located at the rim of the field of lines of force of the bearing cover screws. Furthermore, intersection of oil bores in the critical crankcase area are avoided. The crankcase is thus practically not weakened. Furthermore, the connecting passages are, due to the adjacent position of a longitudinal lubricating bore to the camshaft rather short in the critical upper range of the crankcase so that reductions in the cross section and notching influences are low. The path of the lubricating bore through the engaging surfaces of the crankshaft bearing cover is extremely easy to produce. Furthermore, the region of the gaps of the crankshaft bearing, if they are about perpendicular to the cylinder axis will be located in the relatively slightly stressed bearing zones. The arrangement according to the invention thus will ove the heretofore known bearing lubrication have practically no disadvantages whatsoever.

U.S. Pat. No. 1,370,692 describes reciprocable piston internal combustion engines of the V-type, in which the lubricating passages to a major portion extend on the outside of the crankcase outside the field of lines of force of the bearing screws but in this connection the lubricating oil passages are formed by tubes and not by lubricating bores located in the housing walls. Such an arrangement of the lubricating lines impedes the connection of auxiliary devices and is disadvantageous for structural reasons. Furthermore, the lubricating oil lines, especially when mass fabrication is involved require considerable assembly costs. Moreover, due to the different heat expansions and oscillations, considerable sealing difficulties occur.

With highly stressed crankshaft bearings, it is known to fit the bearing cover in the crankcase, or when a primarily unilateral load is involved, to cause the bearing cover with one side thereof to engage the bearing wall in order to avoid transverse bores.

According to a further development of the invention, it is expedient in such an instance to pass the lubricating oil passage through a lateral engaging surface. As a result thereof, the connecting passage may be placed to run from the longitudinally extending lubricating bore to the crankshaft bearing, still further outside the region of influence of the beairng screw forces.

The sealing at the transition area from the crankcase to the bearing cover may according to a further development of the invention be improved still further by sealing the lubricating oil bore leading to the crankshaft bearing at its transition area to the bearing cover by means of an annular seal.

When high load reciprocable piston internal combustion engines are involved, it is frequently necessary to cool the pistons by cooling oil. For this purpose, as a rule lubricating oil is utilized which is sprayed through a second cooling bore extending along the engine axis through nozzles against the bottom side of the piston bottom. Both lubricating bores, as a rule, extend on opposite sides of the crankcase and are interconnected by transverse bores in the bearing walls. These transverse bores naturally weaken the bearing walls to a considerable extent. For purposes of avoiding these drawbacks, it is suggested according to a further development of the invention that the first lubricating bore is connected to the second lubricating bore through the intervention of a cooling oil passage which is arranged at the end face of the cooling passage provided on the outer wall. In this connection, the cooling oil passage is expediently arranged in an ear which is cast-on, or by a pipeline which is screwed on; said ear or line are separated from the dynamically stressed wall in stress technical respect.

According to a further development of the invention, with the crankcase having cylinder arrangements in which the cylinders form an angle with the vertical longitudinal central plane of the internal combustion engine, it is suggested that the camshaft and a longitudinally extending oil bore are located on the same side of the crankcase and above the common longitudinal central plane of the cylinders. The lubricating oil bores as well as the bearing bores for the camshaft will then be located in a region of the crankcase which is under a relatively low load.

Referring now to the drawings in which all parts having the same function are provided with the same reference numerals throughout all figures, there is illustrated a crankcase 1 for a cylinder arrangement in which the not particularly illustrated cylinders form an angle α with the vertical longitudinal central plane, e.g. of 15°. A camshaft 4 and a longitudinally extending lubricating oil bore 5 are arranged on the same side of the crankcase. Lubricating bore 5 is connected to the camshaft bearing 4 by means of lubricating oil bores 6. From the camshaft bearing, additional connecting bores 7 lead to the crankshaft bearings 8. The connecting bores 7 extend outside bearing cover screws 9 by means of which the crankshaft bearing covers 10 are connected to the crankcase 1. The connecting bores extend through abutment surfaces 11 of the bearing cover 10 and meet transverse bores 12 which intersect the bores 13 of the bearing cover screws 9 and in the vicinity of the separating gaps of the crankshaft bearings 8 lead into the latter. The bearing covers 10 furthermore comprise a lateral engaging surface 15 by means of which they rest unilaterally on the crankcase 1 and from which the transverse bore 12 may be prepared. For purposes of fixing the bearing cover 10 toward the crank housing 1 there are provided centering sleeves 16. For purposes of connecting the cylinders there are provided threaded bores 17.

Figure 2:
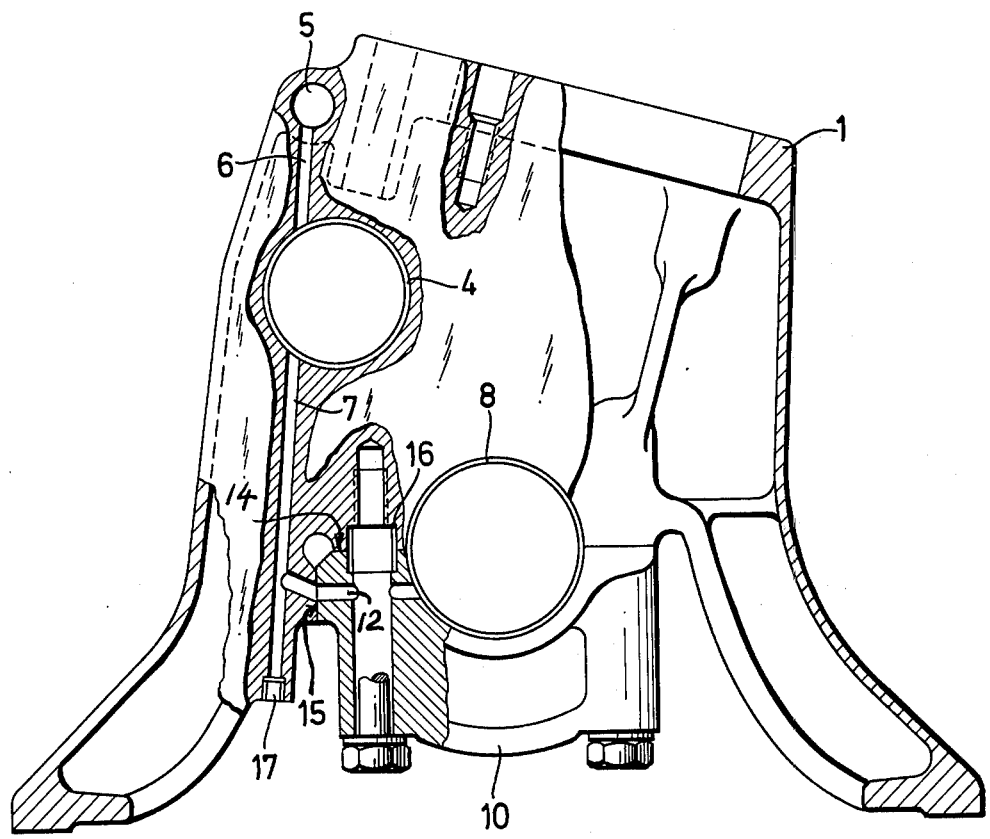

The design according to FIG. 2 differs from that of FIG. 1 primarily in that the lubricating oil bore extends from the camshaft bearing 4 to the crankshaft bearing 8 through the lateral engaging surface 15 of the bearing cover 10. The connecting bore 7 is bored from the lower opening of the crankcase and is closed by a stopper 17.

Figure 3:
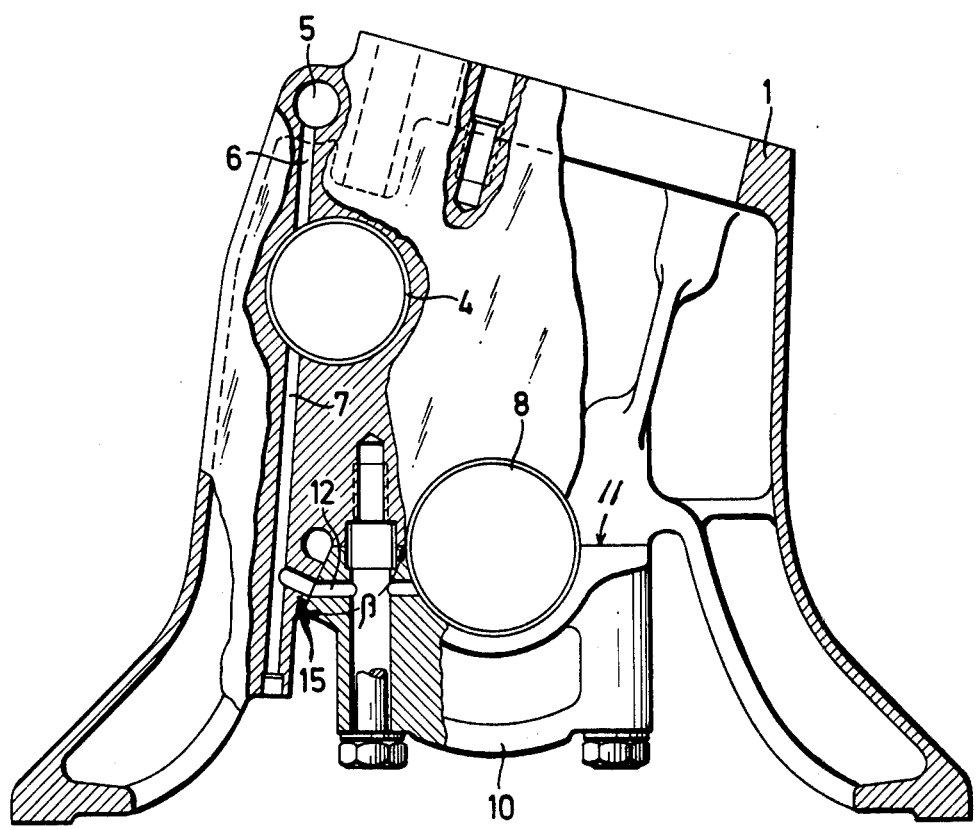

According to the embodiment of FIG. 3, the lateral engaging surface 15 forms with the dividing line or separating surface 11 an angle β which is greater than 90°.

Figure 4:
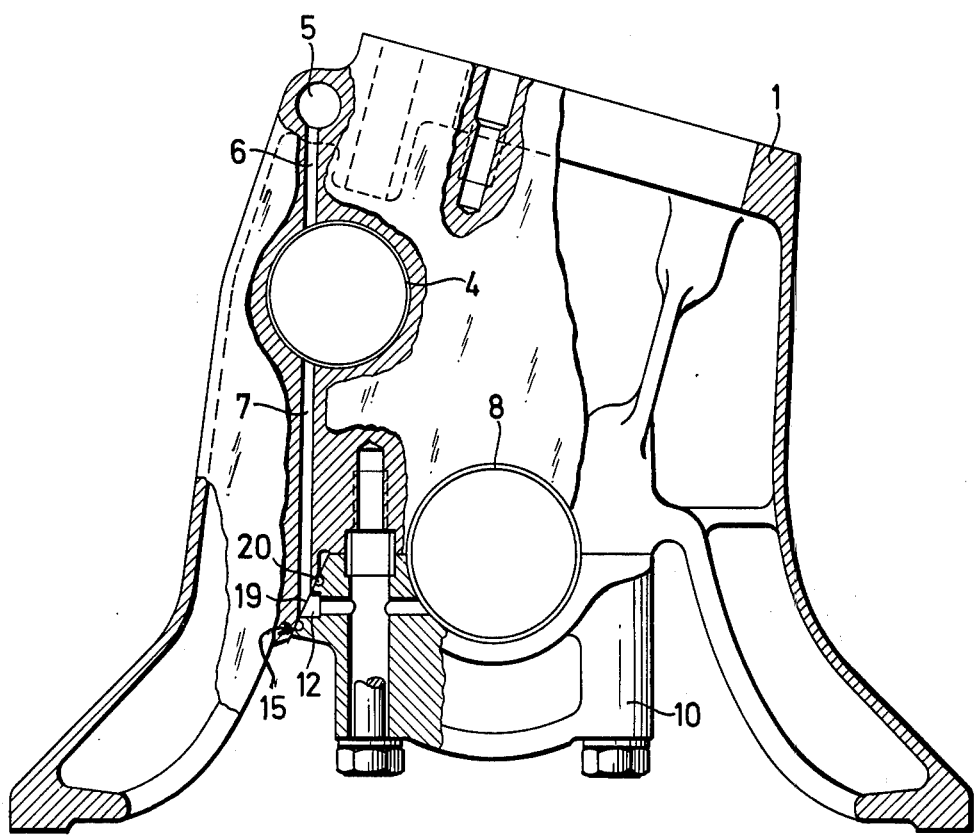

FIG. 4 shows a modification according to which the connecting bore 7 leads directly into the engaging surface 15 and at 19 covers the mouth opening of the transverse bore 12. The mouth openings are surrounded by an annular seal 20 which is inserted into the engaging surface 15.

Figure 5:
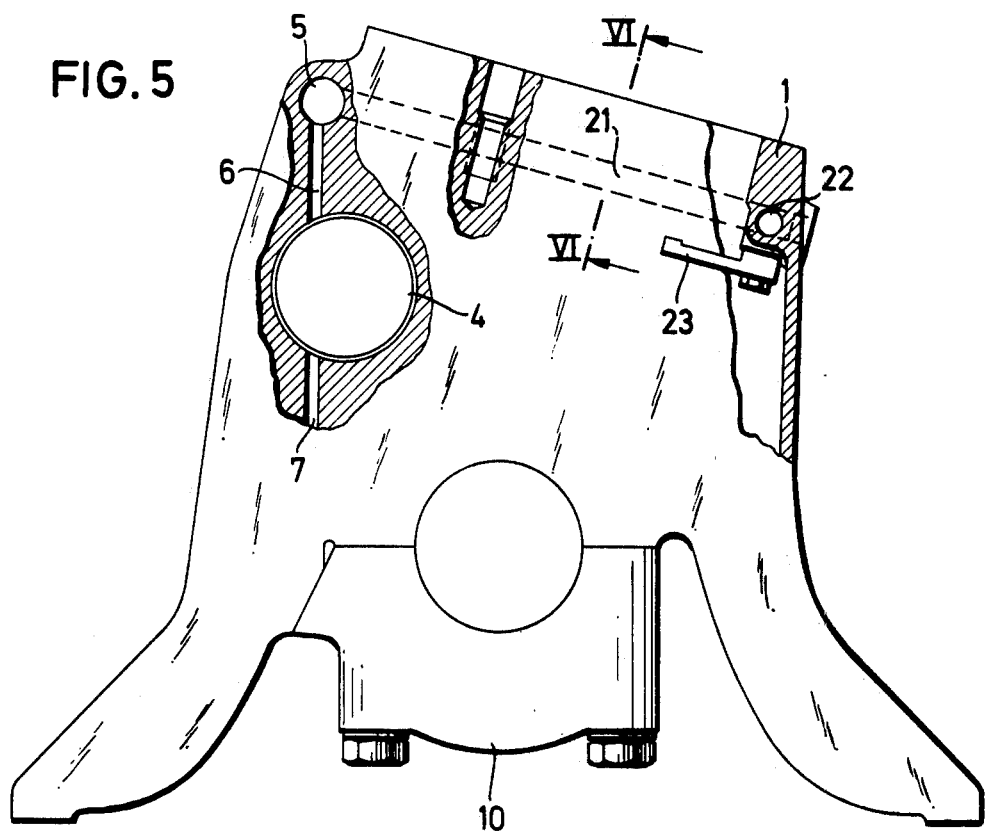
FIG. 5 is a cross section through a crankcase according to the invention with a second longitudinally extending oil passage.
Figure 6:
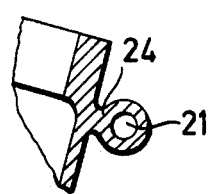
FIG. 6 illustrates a section along the line VI—VI of FIG. 5 and shows a modification of a connecting passage.
Figure 7:
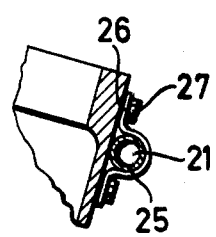
FIG. 7 represents a section similar to that of FIG. 6 but slightly modified thereover.

According to the embodiment of FIGS. 5–7, the first longitudinally extending lubricating bore 5 is by means of an oil passage 21 which is arranged at the end face on the outer wall and which from a stress technical point is separated from the dynamically stressed wall, connected to a second lubricating bore 22 located on the opposite crankcase-side. Connected to the second lubricating oil bore 22 are spray nozzles 23. The oil passage 21 is according to FIG. 16 arranged in a cast-on ear or the like 24, whereas according to FIG. 7, a pipeline 25 is provided which by means of clamps 26 and screws 27 is connected to the crankcase 1 and forms the oil passage 21.

It is, of course, to be understood that the present invention is, by no means, limited to the specific showing in the drawings but also comprises any modifications within the scope of the appended claims.

What I claim is:

1. A crankcase for a multi-cylinder reciprocable piston internal combustion engine of the single row type which includes: camshaft bearing means, crankshaft bearing means divided along a plane of division and arranged in a suspended manner and provided with cover means detachably connected to said crankcase along mutually abutting surfaces, said cover means and said crankcase being provided with aligned bores, the bore in said crankcase being threaded, screw bolt means extending into said bores and threadedly engaging the respective bore in said crankcase, first lubricant conveying conduit means arranged in the vicinity of said camshaft bearing means and extending in the longitudinal direction of said crankcase, second lubricant conveying conduit means leading from said first lubricant conveying conduit means to said camshaft bearing means, third lubricant conveying conduit means leading from said camshaft bearing means to said crankshaft bearing means, said third lubricant conveying conduit means comprising a plurality of sections respectively located in said crankcase and said cover means while intersecting that portion of said screw bolt receiving bore which is located in said cover means, said third lubricant conveying conduit means leading into said crankcase in the vicinity of said plane of divisions of said crankshaft bearing means.

2. A crankcase according to claim 1, which is provided with transverse walls, and which in addition to including said first lubricant conveying conduit means includes at least a fourth lubricant conveying conduit means extending in the longitudinal direction of said crankcase, and channel means establishing communication between said first and fourth lubricant conveying means, said channel means being located outside those portions of said transverse walls which are subjected to dynamic stresses.

3. A crankcase according to claim 2, which includes spray nozzle menas communicating with one of said first and fourth lubricant conveying conduit means.

4. A crankcase according to claim 2, which includes a head cast onto the outside of at least one of said transverse walls of said crankcase and defining said channel means.

5. A crankcase according to claim 2, in which said channel means includes a tube and means connecting said pipe to said crankcase.

6. A crankcase according to claim 1, in which one section of said third lubricant conveying means comprises transverse bore means located in said cover means and extending transverse to the longitudinal direction of said crankcase in which within the region of said transverse bore means said cover means and said crankcase have mutually engaging lateral surfaces.

7. A crankcase according to claim 6, in which said mutually engaging lateral surfaces define with said plane of division of said crankshaft bearing an angle $\beta$ in excess of 90°.

8. A crankcase according to claim 6, in which each of said third lubricant conveying conduit means has its section meet in said mutually engaging surfaces, and which includes annular sealing means arranged in said mutually engaging surfaces to seal said sections toward the outside.

9. A crankshaft according to claim 1, which includes a cylinder supporting wall having its central longitudinal plane inclined at an acute angle with regard to the vertical central longitudinal plane through the longitudinal axis of said crankshaft bearing, said first lubricant conveying conduit means and said camshaft bearing means being located on the same side of said central longitudinal plane.

* * * * *